(12) United States Patent
Grindrod et al.

(10) Patent No.: US 6,868,413 B1
(45) Date of Patent: Mar. 15, 2005

(54) SYSTEM AND METHOD FOR CUSTOMIZING AND PROCESSING BUSINESS LOGIC RULES IN A BUSINESS PROCESS SYSTEM

(75) Inventors: Geoff Grindrod, San Jose, CA (US); Oto Slavos, San Jose, CA (US); Saigiridhar Kodali, Sunnyvale, CA (US); Clinton Hallman, Yardley, PA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 542 days.

(21) Appl. No.: 09/853,360

(22) Filed: May 10, 2001

(Under 37 CFR 1.47)

(51) Int. Cl.[7] .......................... G06F 15/00; G06F 15/18
(52) U.S. Cl. ........................ 706/925; 706/902; 706/59; 707/3
(58) Field of Search .................. 706/925, 902, 706/59; 707/3

(56) References Cited

U.S. PATENT DOCUMENTS 6,424,979 B1 * 7/2002 Livingston et al. ......... 715/511
2002/0049749 A1 * 4/2002 Helgeson et al. ............ 707/3

OTHER PUBLICATIONS http://www.remedy.com/shared/datasheets/pdfs/ActionRequestSystem.pdf (Jun. 1, 2001).
http://www.remedy.com/shared/datasheets/pdfs/Remedy_HelpDesk.pdf (Jun. 1, 2001).

* cited by examiner

*Primary Examiner*—Anthony Knight
*Assistant Examiner*—Joseph P. Hirl
(74) *Attorney, Agent, or Firm*—Zilka-Kotab, PC; Kevin J. Zilka; Christopher J. Hamaty

(57) ABSTRACT

Systems and methods for customizing business logic rules within a business process automation system and for processing business logic rules in a business process automation system are disclosed. The method for customizing business rules of a business logic application generally comprises serving a content page to a client browser of a client by a server that allows entering and modifying of data relating to a business logic rule, generating data by the server according to a predefined format such as a predefined XML format from information received via the content page, and automatically committing the generated data in the predefined format into a database. Preferably, a verification process such as by using DTDs (Document Type Definitions) is performed by the server prior to committing the data. The database stores data including data relating to business logic rules for implementing business logic as entries in the database and the generated data is committed into a corresponding entry in the database. Upon committing, the committed database business rule entry is ready for execution by the business logic application.

64 Claims, 11 Drawing Sheets

| Name | /204 | Enabled | Module | /210 | Description |
|---|---|---|---|---|---|
| Notify Assign To On Ticket Creation /206 | | No | Help Desk | Create | Notify the Assign Tool |
| Notify Group On Ticket Creation  208 | | No | Help Desk | Create 212 | Notify a Group of |
| Notify Did Assign To On Assignment Change | | No | Help Desk | Update | Notify the previous |
| Notify Client On Ticket Close | | No | Help Desk | Update | Notify Client when |
| Notify Client On Ticket Creation Close | | No | Help Desk | Create | Notify Client when |
| Notify Creator On Ticket Close | | No | Help Desk | Update | Notify Creator that |
| Notify Assign To On Ticket Re-Open | | No | Help Desk | Update | Notify the Assign To |
| Notify Client On Ticket Re-Open | | No | Help Desk | Update | Notify Client when |
| Notify Assign To On Ticket Follow-Up | | No | Help Desk | Update | Notify Assign To |
| Notify Email Originator On Ticket Open Via Email | | No | Help Desk | Create | Notify email address |
| Notify Client On Ticket Created Open | | No | Help Desk | Create | Notify client of ticket |
| Notify New Assign To On Assignment Change | | No | Help Desk | Update | Notify the new Assign |
| Example Time Based Escalation - Silver - 1st Alert (Help Desk) | | No | Help Desk | Create Update | 1st Warning Silver |
| Example Time Based Escalation - Silver - 2nd Alert (Help Desk) | | No | Help Desk | Create Update | 2nd Warning Silver |
| Example Time Based Escalation - Silver - 3rd Alert (Help Desk) | | No | Help Desk | Create Update | 3rd Warning Silver |
| Example Time Based Escalation - Silver - Critical Alarm (Help Desk) | | No | Help Desk | Create Update | Critical Alarm Silver |
| Example Time Based Escalation - Silver - Overtime (Help Desk) | | No | Help Desk | Create Update | Overtime Alarm Silver |
| Open Call From Email | | No | Mail Listen | Create | Open a Help Desk |
| Close Call From Email | | No | Mail Listen | Create | Close Call From Email |
| Update Problem From Email | | No | Mail Listen | Create | Update the description |

FIG. 2

SYSTEM AND METHOD FOR CUSTOMIZING AND PROCESSING BUSINESS LOGIC RULES IN A BUSINESS PROCESS SYSTEM

BACKGROUND OF THE INVENTION

1. Field of the Invention

The present invention relates generally to business logic process systems. More specifically, systems and methods for customizing business logic rules within a business process automation system and for processing business logic rules in a business process automation system are disclosed.

2. Description of Related Art

Many companies strive to automate business processes in order to increase productivity, decrease costs, and enhance customer satisfaction. Companies are increasingly utilizing information technology to exploit potential efficiencies through implementation of computerized automated business processes. In particular, many companies have developed software packages that facilitate and automate specific business processes.

However, different business entities implement a broad range of business processes in a broad range of ways because specific business process requirements are often a function of a specific type of business and a specific organizational structure. For example, a business entity may want to develop a software package to facilitate a help desk for computer system, network support, and/or customer support. A completely off-the-shelf help desk system is typically impractical because different entities have different requirements and specifications for such software. One company may wish to integrate a help desk system with an inventory database to keep track of parts inventory for parts used in fixing a computer system. Another company may wish to use the help desk system to facilitate automatic purchasing of parts. Yet another company may wish to use the help desk system to track equipment faults.

As a result, companies typically cannot utilize off-the-shelf business process automation software applications as business logic rules are mostly hard-coded into these software applications. Companies generally resort to developing their own customized business process applications from the ground up and/or modifying off-the-shelf applications to customize the application to their specific requirements and needs. However, both modification and customization options are inefficient, time consuming, and costly, in both financial and personnel resources.

In particular, the development of custom software packages from the ground up typically involves employing expensive teams of programmers and/or consultants to design, create, and debug. Such custom software packages often take many months and even years to design and develop. Furthermore, such custom software packages often must be continually maintained and updated, requiring even greater commitments of time and financial resources. In addition, building a completely customized software system from the ground up for each company is an inefficient utilization of resources. For example, many features of a help desk system are often shared amongst many different organizations to address the same or similar needs.

On the other hand, modification and customization of off-the-shelf business automation software systems is also typically complex, tedious, and costly as it often requires expensive programmers and/or consultants. In addition, such customization of off-the-shelf business automation software systems often voids warranties and/or customer support obligations or agreements or simply render customer support vendor difficult if not impossible.

Thus, what is needed is a system and method that facilitate customizing an off-the-shelf business process automation software system to fulfill specific requirements of a specific business process for a specific organization while providing a user friendly interface. Ideally, customization of such a system and method can be easily implemented and requires minimal or no programming by an administrator of the software application.

SUMMARY OF THE INVENTION

Systems and methods for customizing business logic rules within a business process automation system and for processing business logic rules in a business process automation system are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method for customizing business rules of a business logic application generally comprises serving a content page to a client browser of a client by a server that allows entering and modifying of data relating to a business logic rule, generating data by the server according to a predefined format such as a predefined XML format from information received via the content page, and automatically committing the generated data in the predefined format into a database. Preferably, a verification process such as by using DTDs (Document Type Definitions) is performed by the server prior to committing the data. The database stores data including data relating to business logic rules for implementing business logic as entries in the database and the generated data is committed into a corresponding entry in the database. Upon committing, the committed database business rule entry is ready for execution by the business logic application.

In one preferred embodiment, the serving of a content page may include serving a business rules management content page for displaying business rules stored as entries in the database and for allowing selecting to create a new business rule or modify an existing business rule. The business rules management content page may also allow each business rule to be selectively enabled or disabled.

Generally, data for each business rule may be categorized as general information data, condition data, action data, and schedule data. In particular, the condition, action, and/or schedule data can selectively include data expressed as an expression containing symbols that are to be resolved when an instance of the business rule is either created or executed. The serving of the content page may include serving of an expression builder content page through which an expression may be created and entered.

According to another preferred embodiment, a computer program product for customizing business rules of a business logic application is disclosed. The computer program product generally comprises computer code that serves a content page to a client browser of a client, the content page allowing for entering and modifying of data relating to a business logic rule, computer code that generates data according to a predefined format from information received via the content page, computer code that automatically commits the generated data in the predefined format into a corresponding entry of a database that stores business rules data as entries such that the committed business rule entry is ready for execution by the business logic application, and a computer readable medium that stores said computer codes.

According to a yet another preferred embodiment, a business logic application system adapted for customizing business rules generally comprises a client having a client browser, a database for storing data including data relating to business logic rules for implementing business logic as entries in the database, and a server having a web server for serving content pages to the client browser. Through the content page, data for a given business logic rule corresponding to an entry in the database can be entered and modified. The server automatically commits the data into the entry corresponding to the business logic rule in the database according to a predefined format such as a predefined XML format. Preferably, the server commits the data only after verifying the data using DTDs (Document Type Definitions). The committed database business rule entry is then ready for execution upon commitment by the server.

According to another preferred embodiment, an application/web server for implementing a business logic application system adapted for customizing business rules generally comprises a web server and an application server. The web server is in communication with a client browser of a client and adapted to serve at least one non-programmatic interactive user page to the client browser for obtaining data for a customized business logic rule. The application is in communication with a database that contains data relating to business logic rules for implementing business logic as entries in the database. The data obtained for the customized business logic rule via the non-programmatic interactive user page corresponds to an entry in the database.

After obtaining the data via the content page, the application server is adapted to dynamically and automatically commit the data as an entry corresponding to the customized business logic rule into the database in a predefined format and, upon commitment, the committed database business rule entry is ready for execution by the application server.

The method for processing business logic rules in a business process automation system generally comprising writing an event job into a job queue for each business rule triggered by an event upon occurrence of the event, testing conditions of the business rule for each event job in the job queue, and deleting the event job from the job queue if the test fails. Alternatively, if the test succeeds, the method further includes generating and writing a business rule instance into the job queue if conditions of the business rule are met, deleting the event job from the job queue, executing the business rule instance, and deleting the business rule instance from the job queue.

The method may further include scheduling the business rule instance such that the executing of the business rule instance is according to the scheduling. The execution scheduling of the business rule instance can be selected from delaying job execution, rescheduling job execution, scheduling repeat executions, and suspending execution. In addition, the scheduling may be according to a specified work schedule and/or a time zone.

The executing of the business rule instance may include testing conditions of the business rule instance and deleting the business rule instance form the job queue. In addition, the business rule instance execution also includes executing actions specified by the business rule instance if the instance testing succeeds. The executing actions may generally include scheduling execution as determined according to scheduling data of the business rule instance and executing the actions according to the execution schedule.

The method may further include resolving embedded pre-queue and/or pre-queue symbols in expressions for the event job and/or the business rule instance, respectively. To resolve the embedded symbols, the method may parse the expression hierarchically and resolving the symbols in a recursive manner.

According to yet another preferred embodiment, the method may also comprise monitoring for incoming notifications for and reporting for incoming notification events to the business process system. The executing of the business rule instance may include selectively transmitting an outgoing notification such as sending out mail notifications, pager notifications, Telalerts as promulgated by Telamon and/or NT network message (Netsend) notifications.

A business logic application system for implementing business logic rules generally comprises a job queue module for maintaining a job queue and processing jobs in the job queue and a notification module in communication with the job queue module for monitoring for incoming notification events and reporting the incoming notification events to the job queue module. The job queue module writes an event job corresponding to a business logic rule to the job queue upon receiving an incoming notification event that matches a triggering event of the business logic rule. In addition, the job queue module tests conditions of the business logic rule corresponding to the event job, deletes the event job from the job queue, and, if conditions of the business logic rule are met, writes a business rule instance to the job queue. Furthermore, the job queue module processes the business rule instance and deletes the business rule instance from the job queue.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2 is an exemplary user interface for a business rules manager for the customizable business logic application;

DESCRIPTION OF SPECIFIC EMBODIMENTS

Systems and methods for customizing business logic rules within a business process automation system and for processing business logic rules in a business process automation system are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
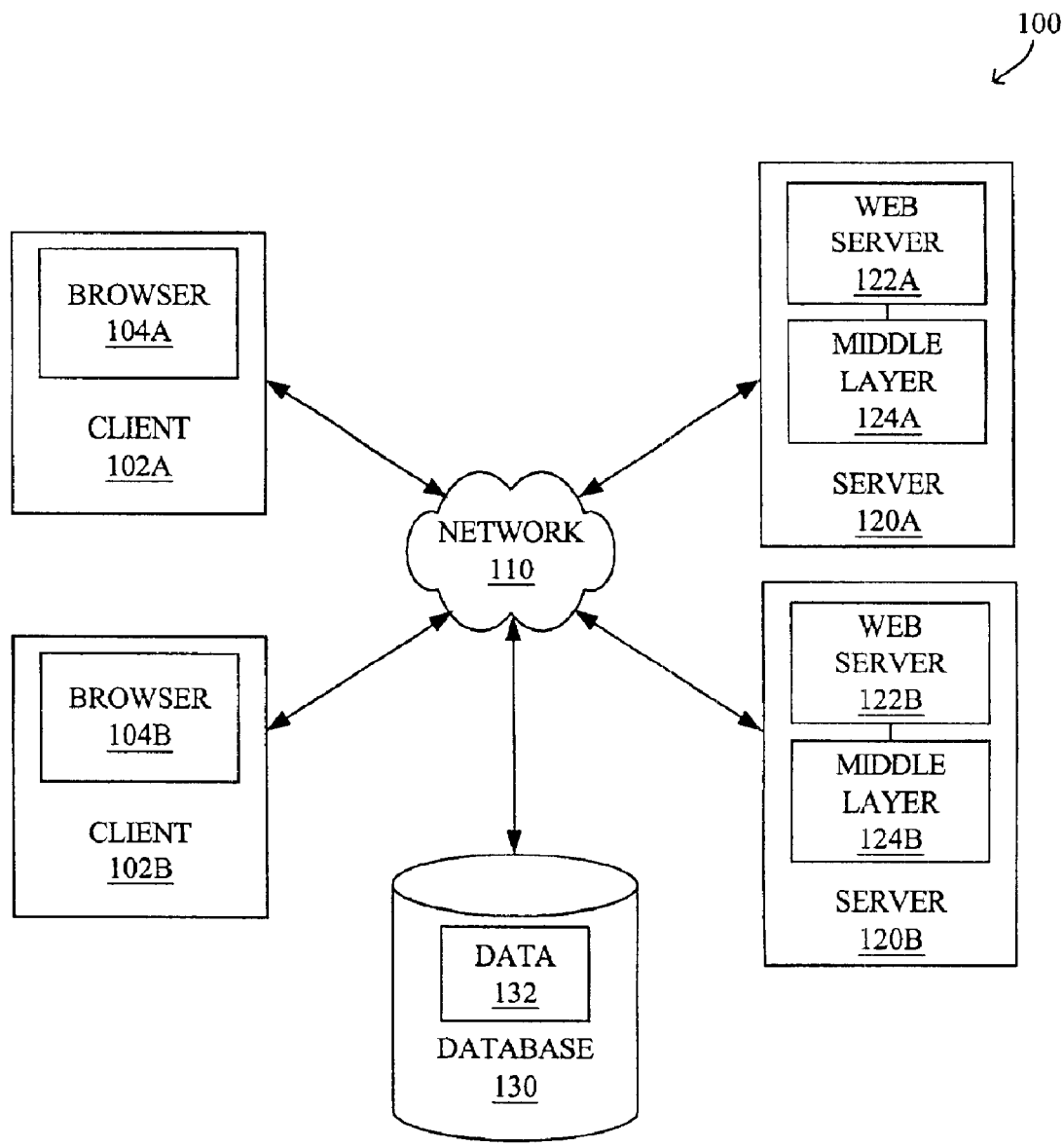
FIG. 1 is a block diagram illustrating a distributed computing system in which a customizable business logic application system and method may be implemented according to one preferred embodiment.

FIG. 1 is a block diagram illustrating a distributed computing system in which a customizable business logic application system and method may be implemented according to one preferred embodiment. The distributed computing system 100 generally includes one or more clients 102A, 102B in communication with one or more application/web or app/web servers 120A, 120B via a network 110. The network 110 may be any suitable network such as an intranet, extranet, and/or the Internet in, for example, a local area network (LAN) and/or wide area network (WAN) environment and may utilize any suitable communication media such as wire and/or wireless communication media capable of transmitting information among a plurality of computing nodes. The distributed computing system 100 further includes a database 130 containing data 132 such as system data and/or user data.

The distributed computing system 100 preferably utilizes a three-tier architecture including a top, middle, and bottom tier. The top tier typically performs user interface functions and includes browsers 104A, 104B within clients 102A, 102B and web servers 122A, 122B within the servers 120A, 120B. The middle tier typically performs business logic functions and includes middle layers 124A, 124B within the servers 120A, 120B. The bottom tier typically stores data and includes the database 130.

Each server 120 may be any suitable computational node capable of servicing requests from a client for tasks such as computational and/or data storage tasks. Each server may be, for example an IIS (Internet Information Server) or MTS (Microsoft Transaction Server). The servers may serve as application service providers (ASPs). As shown, each server 120A, 120B may include a web server 122A, 122B. The web server generally serves as a host for at least one web site or content that serves up web pages or content to the client browsers 104A, 104B via the network 110. Examples of suitable client browsers 104A, 104B include Internet Explorers and Netscape Navigator™. In addition, each web server 122A, 122B communicates with the middle layer 124A, 124B within the server 120A, 120B, respectively. The middle layer 124A, 124B generally includes an application with an application programming interface (API).

The middle layer 124A, 124B also communicates with the database 130 such as via the network 110. The data 132 in the database 130 is accessed by the web server 122 and the middle layer 124 within the server 120. In one embodiment, the clients 102A, 102B, the servers 120A, 120B, and the database 130 may each reside on a separate node within the distributed computing system 100 as shown. Alternatively, although shown as separate nodes or components, any combination of the clients 102A, 102B, the servers 120A and 120B, and the database 130 may reside on a same node within the distributed computing system 100. Oracle database server such as Oracle 8I Database and Microsoft SQL server are some examples of common database servers.

The distributed computing system 100 shown in and described with reference to FIG. 1 is but one example of a computing system in which a customizable business application may be implemented. In the customizable business logic application, a business rule generally refers to a logical statement defined around events occurring in the database within the customizable business logic application system. An event refers to the creation, modification, deletion, or fetch of a ticket or record in the database. Business logic rules are generally stored in the database. Data corresponding to business logic rules may be also optionally cached as metadata for purposes of efficiency. Metadata is generally uploaded and captured onto each application/web server from the database when the business logic application is first started. Where multiple servers are utilized, metadata is optimally synchronized amongst the servers.

Business rules are generally designed to fit the needs of the company in which the customizable business logic application is utilized. A business rule is an expression of one or more conditions and one or more actions such that when the one or more conditions are met, the one or more actions are triggered.

As an example, a business logic rule may specify that an e-mail is to be sent to a manager when a help desk ticket is closed. As another example, a business logic rule may specify that a next work order is to be opened in sequence after a help desk ticket closes. Yet another example is a business logic rule that specifies that a help desk ticket priority is to be upgraded in priority when the ticket becomes a week old.

Some exemplary user interfaces that may be utilized to facilitate a business logic system administrator in the management of the customizable business logic application are first described with reference to FIGS. 2–6. Various processes implemented by the customizable business logic application will then be described with reference to FIGS. 7–10.

User Interfaces for Management of the Customizable Business Logic Application

Business Rules Management Console 200

FIG. 2 is an exemplary user interface for a business rules manager or a business rules management console 200. The business rules management console user interface 200 is typically the starting point for an administrator of the customizable business logic application administrator. The business rules management console 200 facilitates management of the business rules application and allows the administrator or end user to create and/or modify business rules in order to customize business processes.

In particular, the business rules manager 200 displays business rules 202 that have been defined. For each defined business rule 202, the business rules manger 200 preferably displays a name 204 of the business rule, whether the rule is enabled 206, a module 208 that the business rule affects, a method 210 implemented by the business rule that will be called on the specified module, and a description 212 of the business rule. The methods that may be implemented by a given business rule preferably include create, update, delete, and fetch. The description 212 of a given business rule typically corresponds to a description entered by an administrator of the business logic application who created or modified the given business rule.

From the business rules management console 200, the administrator may elect to create, modify, or delete a business logic rule. In addition, the administrator may elect to enable or disable a defined business logic rule. Once a business rule is enabled, a business rule instance of the business rule is created each time the pre-defined event associated with the business logic rule occurs.

FIGS. 3–6 are exemplary user interfaces for customizing business rules in the customizable business logic application. In particular, FIGS. 3–6 are exemplary user interfaces 220, 230, 250, and 270 for entering or modifying and displaying general information, conditions, actions, and schedule, respectively, regarding a new business rule or an existing business rule selected via, for example, the business rules manager. Preferably, each of the user interfaces 220, 230, 250, and 270 displays and allows the modification of the name 204 of the selected or new business rule and whether the business rule is enabled 206.

Data relating to each business rule is optionally stored as individual units in the database. In addition, the information corresponding to each component of the business rule, namely, general information, conditions, actions, and schedule, is preferably stored in a table in the database. TABLES I–IV are exemplary tables that may be utilized to facilitate storage of such business rule data. Each table may be cached in metadata for purposes of efficiency.

Business Rules General Information User Interface 220

Figure 3:
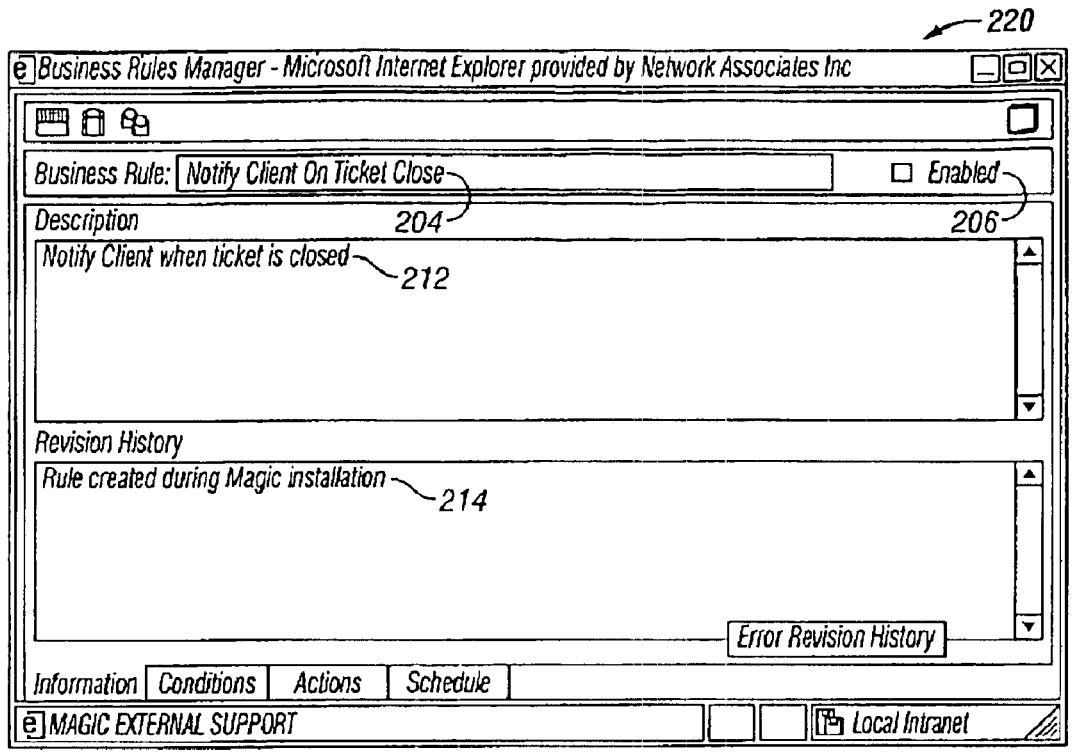
FIG. 3 is an exemplary user interface for entering or modifying and displaying general information regarding the selected business rule or a new business rule for the customizable business logic application.

As noted, FIG. 3 is an exemplary user interface 220 for entering or modifying and displaying general information regarding the selected business rule or a new business rule. As shown, the general information user interface 220 may display and facilitate the entering or modification of the business rule description 212 and its a revision history 214 of the business rule.

As noted above, business logic rules are generally stored in the database. As such, general information regarding each business rule is generally stored in the database. TABLE I is an exemplary table that may be utilized to facilitate storage of general information regarding a corresponding business rule. The table may optionally be cached in metadata for purposes of efficiency.

TABLE I

| COLUMN | DATA TYPE | DATA DESCRIPTION |
|---|---|---|
| SEQUENCE | NUMBER | Unique ID |
| LASTMODIFIED | DATETIME | When record was last modified |
| MODULE | NUMBER | Module of the event that the rule intercepts |
| METHOD | NUMBER | Method of the event that the rule intercepts |
| NAME | VARCHAR | Name of business rule |
| DESCRIPTION | TEXT | Textual description of business rule |
| REV_HISTORY | TEXT | Text field for entering revision history/rule changes |
| ENABLED | BOOLEAN | Enable/disable execution of rule |

Business Rules Conditions User Interface 230

Figure 4:
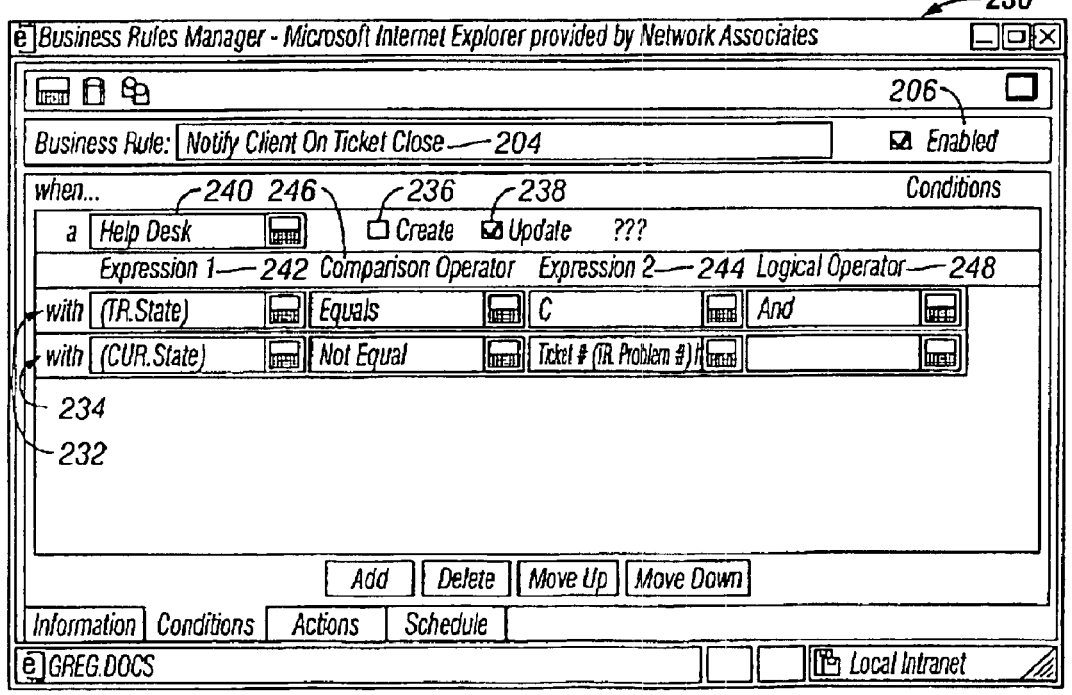
FIG. 4 is an exemplary user interface for entering or modifying and displaying conditions of the selected business rule or a new business rule for the customizable business logic application.

FIG. 4 is an exemplary user interface 230 for entering or modifying and displaying conditions of the selected business rule or a new business rule. The business rule conditions are conditions that need to be met in order for the actions defined by the business rule to be triggered. In other words, the conditions are the "if" part of an "if . . . then . . . " statement.

Each business rule preferably specifies one or more conditions 232, 234 to be evaluated upon an occurrence of a pre-defined event, e.g., create 236 or update 238, associated with a business rule module 240 such as Help Desk. Preferably for each condition, two expressions 242, 244 and a comparison operator 246 for comparing values of the two expressions as well as a logical operator 248 for allowing grouping of conditions may be specified.

The two expressions 240, 242 may be created by the administrator using an expression builder as will be described in more detail below. Examples of comparison operators 236 include equal to, not equal to, less than, less than or equal to, greater than, greater than or equal to, contains, does not contain, and none. Examples of logical operators 238 include and, or, exclusive or, and none. Any other suitable comparison operators and/or logical operators may be utilized.

The business logic application preferably processes each condition line by line beginning with the first condition specified in the user interface 230. In the example shown in FIG. 4, the business logic application would evaluate or process the first condition 232 prior to evaluating or processing the second condition 234, if at all. In particular, the business logic application evaluates the first condition 232 to determine if the transaction data for state is equal to C. If the first condition 232 is met, then the business logic application proceeds to evaluate the second condition 234. Alternatively, if the first condition 232 is not met, then the business logic application preferably does not evaluate the second condition 234 as an "AND" logical operator 238 links the first and second conditions 232, 234.

TABLE II is an exemplary table that may be utilized to facilitate storage of conditions data of a business rule. The table may optionally be cached in metadata for purposes of efficiency.

TABLE II

| COLUMN | DATA TYPE | DESCRIPTION |
|---|---|---|
| SEQUENCE | NUMBER | Unique ID |

TABLE II-continued

| COLUMN | DATA TYPE | DESCRIPTION |
|---|---|---|
| LASTMODIFIED | DATETIME | When record was last modified |
| SEQ_BL | NUMBER | Business rule the condition relates to in the general information table (TABLE I) |
| METHOD | NUMBER | Method (Create, Update, Delete, Fetch) the rule is called on |
| POSITION | NUMBER | Used to control order of testing |
| DATA | TEXT | Condition data |

Figure 5:
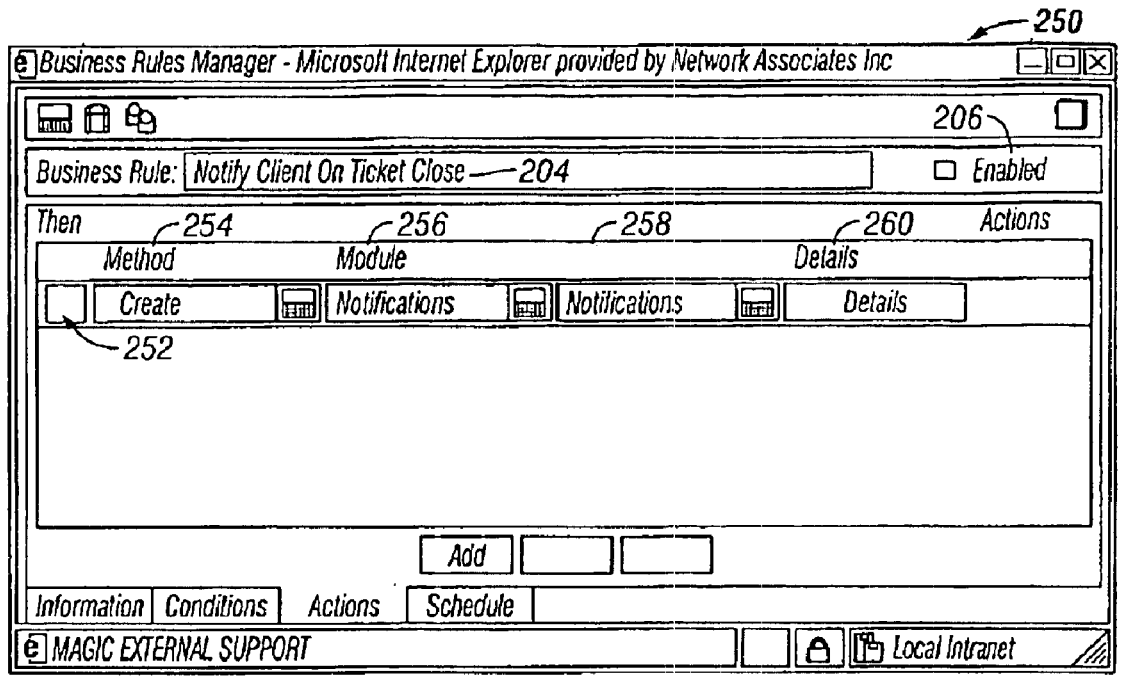
FIG. 5 is an exemplary user interface for entering or modifying and displaying one or more actions of the selected business rule or a new business rule for the customizable business logic application.

Business Rules Actions User Interface 250 FIG. 5 is an exemplary user interface 250 for entering or modifying and displaying one or more actions 252 of the selected business rule or a new business rule.

In particular, the business rule actions are actions that are to be performed when the conditions are met. In other words, the actions are the "then" part of an "if . . . then . . . " statement. Each business rules includes one or more actions 252. Typically for each action 252, a method 254 to be performed by the action, a module 256 that the action affects, a form 258 to be associated with the action to be performed, as well as details 260 regarding the action may be specified.

The method 254 may be selected from, for example, create, update, delete, and fetch. Examples of modules 256 include Help Desk, Notification, and Create Email. The form 258 may be a default form or a customized form corresponding to the selected module 256.

Details 260 for the action 252 to be performed may include, for example, values for fields associated with the form 258 and/or any other suitable values. For example, details for a notification form may include subject, message content of and/or recipient of the notification. It is noted that an action may call a module without writing or modifying a record in the database. For example, an action may be "send notification" that calls a notification module upon occurrence of a specified event and does not modify any record in the database.

TABLE II is an exemplary table that may be utilized to facilitate storage of action data of a business rule. The table may optionally be cached in metadata for purposes of efficiency.

TABLE III

| COLUMN | DATA TYPE | DESCRIPTION |
|---|---|---|
| SEQUENCE | NUMBER | Unique ID |
| LASTMODIFIED | DATETIME | Date that record was last modified |
| SEQ_BL | NUMBER | Business rule the condition relates to in the general information table (TABLE I) |
| POSITION | NUMBER | Used to control order of execution |
| NAME | VARCHAR | Name of action |
| DESCRIPTION | TEXT | Description of what action does |
| REV_HISTORY | TEXT | Revision history |
| DATA | TEXT | Action data |

Business Rules Schedule User Interface 270

Figure 6:
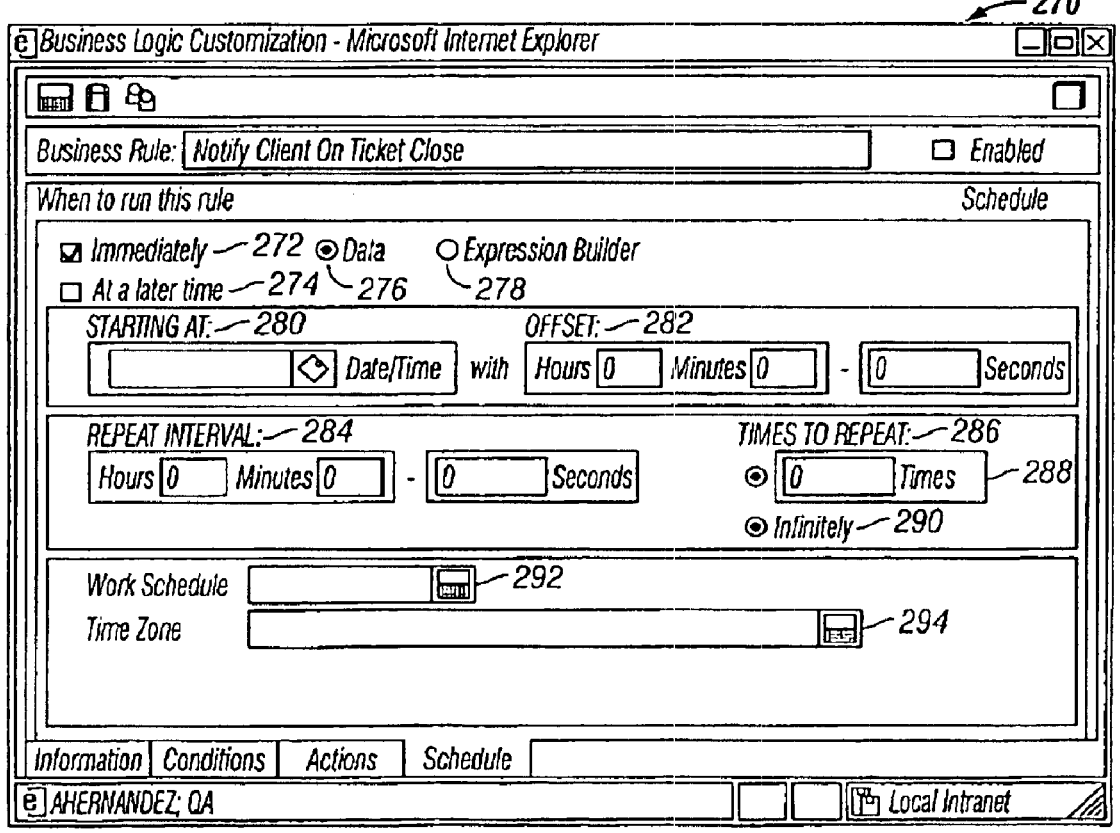
FIG. 6 is an exemplary user interface for entering or modifying and displaying a schedule for the selected business rule or a new business rule for the customizable business logic application.

FIG. 6 is an exemplary user interface 270 for entering or modifying and displaying a schedule for the selected business rule or a new business rule. In particular, the business rule may be scheduled to run via the schedule user interface 270. The schedule user interface 270 allows specification of when the business logic rule is to run. The business rule may be scheduled to run immediately 272 and/or at a later time 274. In the example shown in FIG. 6, the rule is to be run immediately. Regardless of the immediate or deferred specification, execution of business rules will generally be performed asynchronously to the operation that they intercepted.

If the later time option 274 is selected, the scheduling may be determined utilizing either data 276 or a placeholder for current or transactional data as specified via the expression builder 278. For example, a specific start time 280 may be specified or a start time 280 may be described utilizing the expression builder 278 option.

In addition, an optional offset 282 may be specified such that the action of the business rule would be delayed by an amount specified by the offset 282 after the specified start time 280. In the preferred embodiment, the offset 282 may be set only when the data option 276 is selected.

The schedule user interface 270 further allows the administrator to set an optional repeat interval 284, an optional time to repeat 286 such as a finite number 288 or indefinitely or infinitely 290.

A work schedule 292 and/or a time zone 294 may also optionally be set. With a specified work schedule 292, if the business rule is set for "at a later time" and that time is outside of the specified work schedule 292 for the specified time zone 294 or the default time zone if no time zone is specified, then, according to one embodiment, the rule will not fire until it is within the work schedule 292.

The customizable business logic application preferably disallows enabling of the business rule until all requisite information has been defined, such as via the exemplary general information, condition, action, and schedule user interfaces. The requisite minimum information may include, for example, general information, one condition, one action, and one scheduled time.

In addition, once the administrator has completed designing the new or modifying the selected business rule, the new or modified business rule can be saved and committed to the database. Prior to committing a business rule to the database, the customizable business logic application preferably performs a design time validation process to validate the rule conditions, actions data, and schedule of the business rule. Alternatively, the customizable business logic application may only perform the validation process on enabled business rules while allowing the saving of a non-enabled business rule that may not be valid or may only be partially specified to the database.

TABLE IV is an exemplary table that may be utilized to facilitate storage of schedule data of a business rule. The table may optionally be cached in metadata for purposes of efficiency.

TABLE IV

| COLUMN | DATA TYPE | DATA DESCRIPTION |
|---|---|---|
| SEQUENCE | NUMBER | Unique ID |
| LASTMODIFIED | DATETIME | Date that record was last modified |
| SEQ_BL | NUMBER | Business rule condition relates to in the general information table (TABLE I) |
| RUN_IMMEDIATELY | BOOLEAN | Run rule immediately when event occurs |
| RUN_DEFERRED | BOOLEAN | Run rule at a later time |
| INTERVAL | VARCHAR | Specifies interval at which rule will run (Supports business logic expressions) |
| REPEAT_TIMES | VARCHAR | Maximum number of times rule will run (supports business logic expressions) |

TABLE IV-continued

| COLUMN | DATA TYPE | DATA DESCRIPTION |
|---|---|---|
| WORK_SCHEDULE | VARCHAR | Allows specification of a work schedule for the rule (supports business logic expressions) |
| TIME_ZONE | VARCHAR | Allows specification of a time zone for the rule (supports BL expressions) |
| DATE_TIME | VARCHAR | Specifies a date/time to run the rule (once only) (Supports BL expressions) |
| DATE_TIME_OFFSET | VARCHAR | Specifies an offset adjustment that will be applied to the DATE_TIME |

Building Expressions Using Expression Builder Utility

Figure 7:
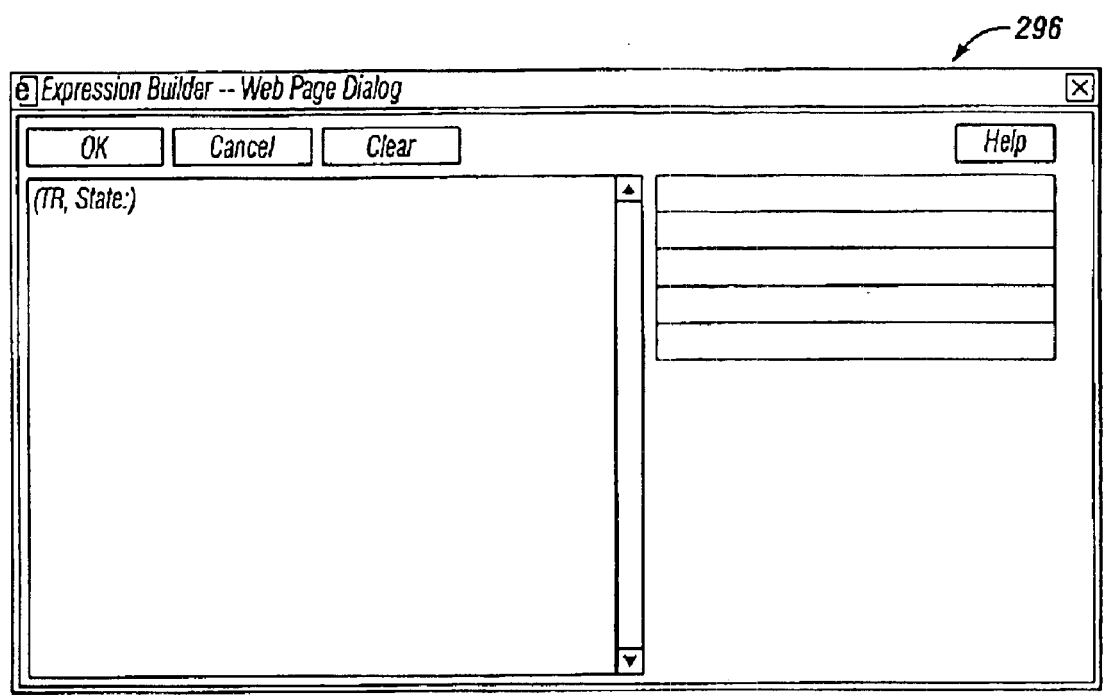
FIG. 7 is an exemplary expression builder utility user interface for entering or modifying expressions for business rules of the customizable business logic application.

FIG. 7 is an exemplary expression builder utility user interface 296 for entering or modifying expressions for business rules of the customizable business logic application. As discussed above, some of the conditions and schedule information of the business rule may be expressed as expressions that may be entered via an expression builder. Thus, the customizable business logic application preferably provides an expression builder utility to facilitate the administrator in entering expressions as part of defining business rules and/or business rules templates. The expression builder utility preferably allows the administrator to enter expressions that contain, for example, one or more business logic symbols and any optional text.

Expressions are values that are entered by the administrator that can contain a set of symbols to be resolved at various stages of the business rule execution cycle. The symbols allow access to various event-related and/or other system-related information that can be directly inserted into, for example, grammatical sentences used as the body of an e-mail message. Symbols generally refer to recognized text strings. When used in a string specified as a property on a field, symbols allow access to information that is variable at the time the business rule instance is created and/or executed.

The following are examples of expressions in which symbols are designated with brace characters { }. Examples of expressions include:

Hello, the time is {TIME}.
  The Help Desk Ticket {TR, Problem No.} was created in response to your request on {DATE} at {TIME}.
  {DB, Clients, Client ID, "Sequence"=1221}

As shown in the sample expression builder user interface 296, symbols may represent various types of data such as current record data, transaction data, symbolic values, system environmental variables, and/or database lookup, business rules templates, mathematical operations, and/or action return sequence. Each of these is described in more detail below.

Current record data and transaction data are transient data that may be represented in an expression. Transient symbols are collections or record data that is made available to business logic when rules are being executed. In other words, transient symbols are used to refer to data that is made temporarily available during the execution of business rules. Transient data allows business rules to refer to or examine data items such as the transactional data and current data.

Transaction data refers to data that is sent to a business logic call that the business rule intercepted or that is otherwise used to perform the operation that the given business rule intercepted. For example, where the intercepted method is update and causes the business logic to fetch the record set that is to be updated prior to the operation to allow comparisons to be made in business logic, the transaction data represents the current state of a specified set of rows in the database. Transaction data may also be utilized where the method is create and represents the new data that is to be saved to an existing or new record for create and update operations.

In contrast, current data refers to data that existed in the database prior to the operation that the given business rule intercepted for update and delete operations, i.e., data in the database before the record was deleted or updated.

Symbolic values generally represent data that is substituted when the symbol is resolved or evaluated as part of an expression. Although not necessarily constant, symbolic values represent static data that are resolved at the time the business logic executes. Examples of symbolic values include current time, current time zone, current date, name of database server being used, type of database (e.g., Oracle or MS SQL), current event module, current event method, version of the business logic, description of the business logic, version of the database, user who initiated the event, name of application server, sequence number of the rule, name of the rule, description of the rule, and name of virtual directory of the application server.

System environmental variables generally represent the values of specified environment variables on the server. System variables typically are evaluated with data obtained from the application server.

Database lookup allows a query to find and use data in the database and represents a fetch operation from the database when resolved. Database lookup is preferably performed at the time of the business rule execution particularly if the rule is scheduled for deferred or repeat execution. Typically a database fetch operation may be used in place of adding a virtual field to a table or for conditions where there is no relationship between the transactional or current data and a particular table that stores information for which access is needed.

Preferably, business rules templates are provided. Business rules templates are predefined and reusable text items that can be defined, stored, and reused by various business rules. Templates are especially suitable for reuse of large text strings such as for sending out a standard email message via several different business rules. Templates are typically stored in the database and managed through the presentation layer or top tier. Templates allow the same string of text to be re-used by multiple business rules. Business rules templates typically are notifications and other text string templates. For example, various types of help desk notification messages typically all include certain common information such as the help desk ticket number, the problem number, open and/or close date, severity, expected resolution time, problem description, and/or problem resolution.

The expression builder preferably supports mathematical operation symbols. A mathematical calculation symbol accepts argument(s) and hands them off to the back end database for processing. In the absence of having another symbol to solve a problem, the mathematical calculation allows the use of SQL (Structured Query Language) for advanced calculations.

The expression builder preferably also supports action return sequence symbols. An action return sequence may be used in a business rule with multiple actions to find out the sequence of the record that a specified action affected. In particular, actions are indexed by a number that corresponds to their position as displayed in the user interface. An action return sequence symbol is generally only valid in a context of executing business rule actions such that if an action return sequence symbol is used in a business rule condition, an empty string may be returned.

It is noted that embedded expression symbols are preferably supported. An example of embedded expressions is:

{DB, Help Desk, Problem Description, "Problem #"={TR, Problem #}}

In the example above, the inner symbol {TR, Problem #} is embedded within the outer symbol {DB . . . }. When embedded symbols are resolved, the inner most symbols are preferably resolved first followed by each successive outer symbol.

Symbol resolution is a phase of business rule execution that searches an expression for business logic symbols and replaces each symbol with a corresponding resulting value of that symbol. Depending upon the symbol, the symbol can be resolved when the business rule instance is created, i.e., pre-queue, or when the business rule instance is executed, i.e., post-queue. Pre-queue symbol resolution is a phase of business rule execution that resolves all symbols in an expression that are to be resolved when the business rule instance is created in a job queue. Post-queue symbol resolution is a phase of business rule execution that resolves symbols in an expression that are to be resolved when the business rule instance is executed from the job queue. Job queue will be described in more detail below.

TABLE V illustrates examples of transaction, current, and database fetch operation symbols as well as whether resolution of which is pre-queue or post-queue.

Figure 8:
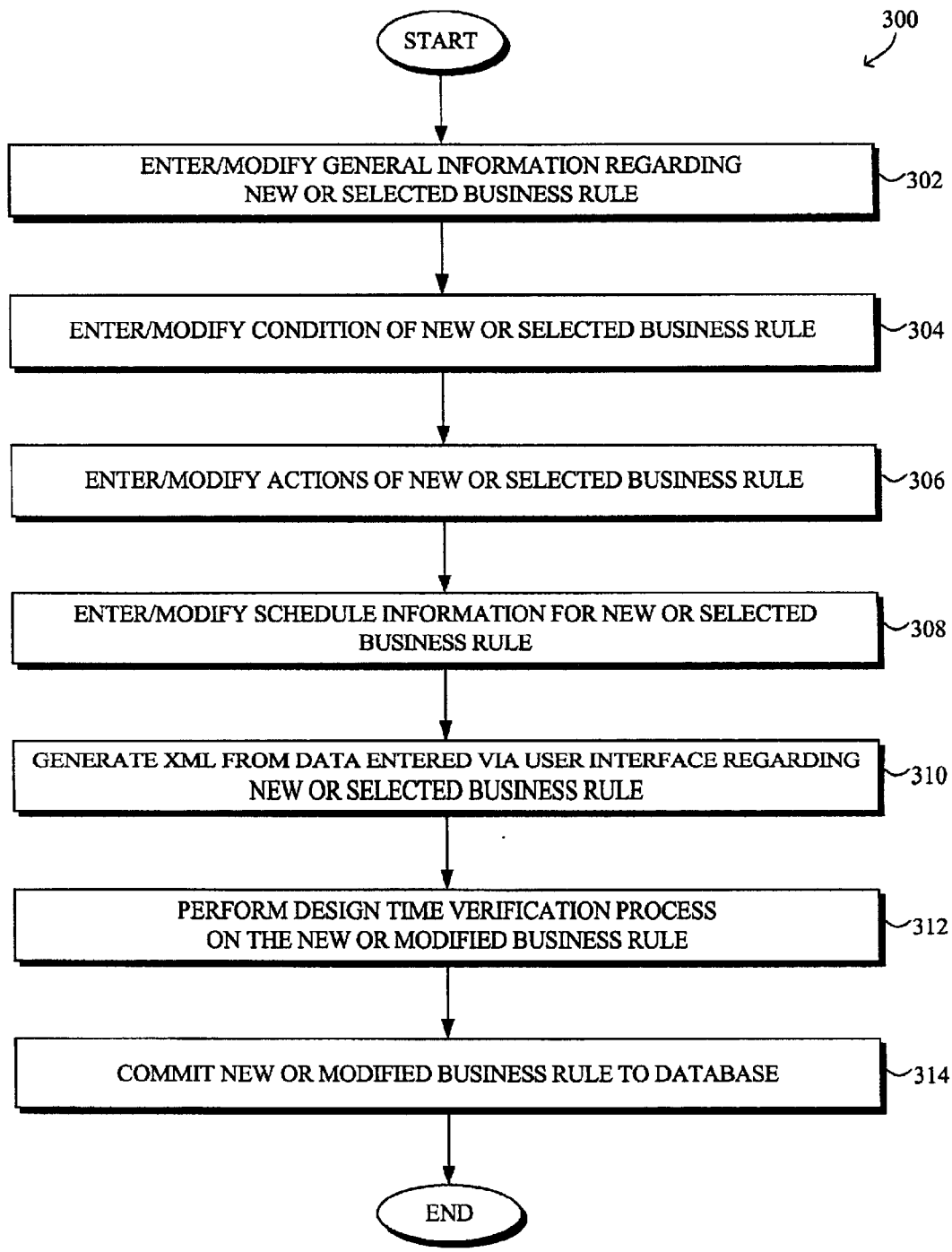
FIG. 8 is a flowchart illustrating a process for creating, modifying, and managing customized business rules in a customizable business logic application.

FIG. 8 is a flowchart illustrating a business logic customization process 300 for creating, modifying, and managing customized business rules in a customizable business logic application. At step 302, the administrator enters or modifies general information regarding a new or selected existing business rule such as via a general information business rules user interface. At step 304, the administrator enters or modifies condition information regarding the new or selected business rule such as via a condition business rules user interface.

At step 306, the administrator enters or modifies action information regarding the new or selected business rule such as via an actions business rules user interface. At step 308, the administrator enters or modifies schedule information for the new or selected business rule such as via a schedule business rules user interface. Examples of each of these user interfaces are described above.

It is noted that all of steps 302–308 are preferably performed for a new business rule. However, for modifying an existing business rule, any number of steps 302–308 may be performed in order to modify the existing business rule. In addition, steps 302–308 need not be performed in the order as described. Further, the administrator may return to any of steps 302–308 in order to further modify or add new information.

Next, at step 310, XML is generated from data regarding the new or modified business rule as entered or modified via the user interfaces. It is noted that as discussed above, some of the conditions and schedule information of the business rule may be expressed as expressions containing various symbols. Thus, such information expressed in XML may include expressions having symbols.

TABLE V

| Symbol | Description | Example(s) | Resolution |
|---|---|---|---|
| {TR,} | Transaction data | {TR,Status}<br>{TR,Sequence}<br>{TR,23} | Pre-Queue |
| {CUR,} | Current data | {CUR,Client}<br>{CUR,LastUser}<br>{CUR,12} | Pre-Queue |
| Symbolic | Static data substituted in when symbol is evaluated/resolved. | {DATE} | Post-Queue |
| | | {TIME} | Post-Queue |
| | | {EVENTMODULE} | Pre-Queue |
| | | {EVENTMETHOD} | Pre-Queue |
| | | {APPSERVER} | Post-Queue |
| | | {DBSERVER} | Pre-Queue |
| | | {DBTYPE} | Pre-Queue |
| | | {MAGICDBVERSION} | Pre-Queue |
| | | {TZ} | Post-Queue |
| | | {BLVERSION} | Pre-Queue |
| | | {BLDESCRIPTION} | Pre-Queue |
| | | {BLUSER} | Pre-Queue |
| | | {RULESEQUENCE} | Pre-Queue |
| | | {RULENAME} | Pre-Queue |
| | | {RULEDESCRIPTION} | Pre-Queue |
| | | {VIRTUALDIR} | Pre-Queue |
| {ENV,} | Sever environment variable | {ENV,COMPUTERNAME}<br>{ENV,USERDOMAIN}<br>{ENV,WINDIR } | Post-Queue |
| {DB,} | Database fetch | {DB,Clients,ClientID, "SEQUENCE"=222} | Post-Queue |
| {TEMPL,} | Template text substituted | {TEMPL,name} | Pre-Queue |
| {MATH,} | Mathematical calculation | {MATH,1 + 2}<br>{MATH,100/50} | Post-Queue |
| {AR,} | Action Return Sequeuce | {AR,1}<br>{AR,5}<br>[sequence of database record involved in 1$^{st}$ and 5th actions, respectively] | Post-Queue |

At step 312, the new or modified business rule is verified in a design time verification process. At step 314, the verified new or modified business rule is committed to the database.

Each of the design time verification process 312 and XML format are described in more detail below.

Design Time Verification Process 312

Figure 9:
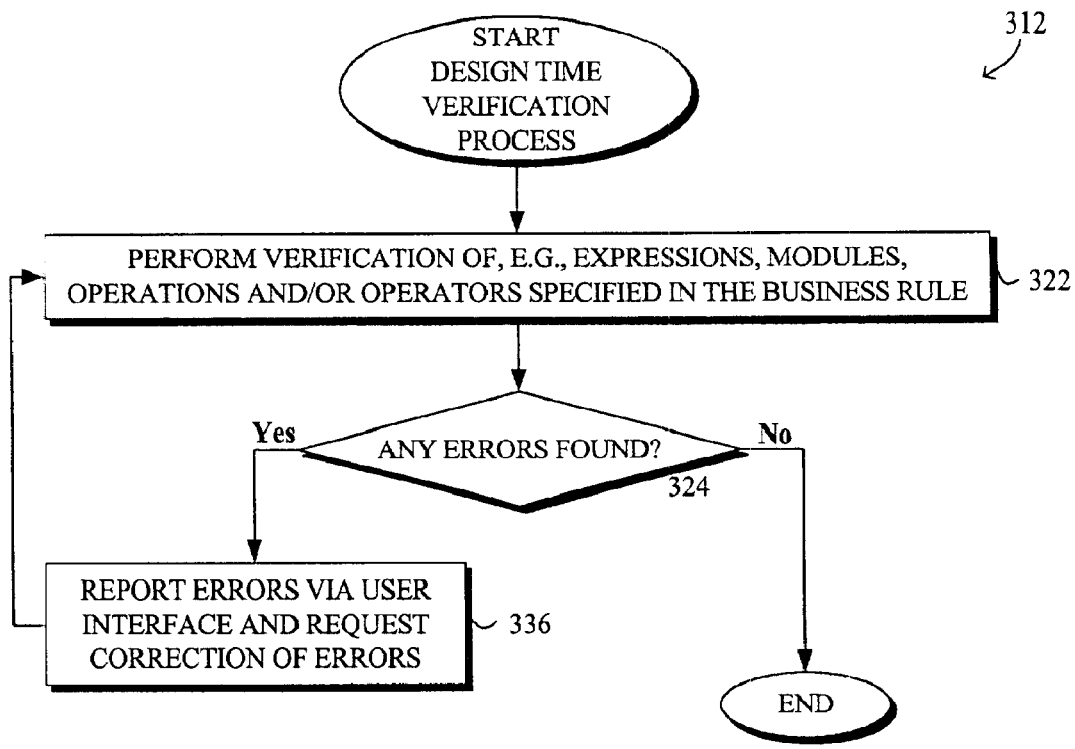
FIG. 9 is a flowchart illustrating a design time verification process.

FIG. 9 is a flowchart illustrating the design time verification process 312 in more detail. The design time verification process 312 is part of an effort to minimize problems resulting from malformed or invalid business logic statements. The design time verification process 312 ensures against any obvious problems with the business logic. For example, problems such as those that may cause a server hang are pinpointed and corrected prior to allowing the administrator to commit the business rule to the database. It is noted that another verification process, a runtime verification process, is preferably also performed on the business logic rules at runtime.

In particular, at step 322, verification of expressions, modules, operations, and/or operators specified in the business rule is performed. In particular, the rule conditions, actions data, and schedule of the business rule are verified. For example, step 322 may ensure that the expressions, modules, operations, and/or operators are specified in the correct context and have valid values for their defined data types is performed. Preferably, step 322 utilizes DTDs (Document Type Definitions) to verify business rules represented in XML.

Next at step 324, the design time verification process determines if there are any errors. If no errors are found, then the process 312 is complete. Alternatively, if any errors are found, such errors are reported to the administrator via a user interface at step 326. Once the administrator reaches the design time verification process 312 such as by selecting to commit the business rule at the database, the design time verification process 312 returns to step 322 until all errors have been corrected.

XML Format

XML (Extensible Markup Language) is preferably utilized to represent and store data regarding the business rules in the database. In particular, condition and action data are preferably represented in XML and stored in the XML format in the database. The use of XML to represent business rules allows the use of DTDs (Document Type Definition) for validation of the business rule information and thus facilitates in preventing malformation of business rules.

Specifically, conditions of business rules are preferably stored in a defined XML format in a logical layout. Similarly, actions of business rules are preferably stored in a defined XML format with a logical layout that allows calls to be made to actions with a set of action parameters (as defined via action details in the example shown in FIG. 5). Thus, the XML representation provides a simplistic approach to building and validating basic IF . . . THEN constructs. It is noted that XML representation of conditions and actions of business rules may include expressions that are to be resolved during execution of the business rule.

TABLE VI illustrates an exemplary format of the condition data as stored in the database according to one preferred embodiment. In addition, the following is an example of a business logic condition as represented in XML which may be stored in the database:

<ROOT>
  <CONDITION 01="TR.7" CO="NOT_EQUAL" 02="Joe" LO="AND"/>
  <CONDITION 01="TR.1002" CO="EQUALS" 02="C"/>
</ROOT>

TABLE VI

| ROOT NODE | CONDITION NODE | OPERAND 1 | COMPARISON OPERATOR | OPERAND 2 | LOGICAL OPERATOR |
|---|---|---|---|---|---|
| <ROOT> | | | | | |
| | <CONDITION | 01="{EXPR}" | CO="{ EQUALS \|NOT_EQUALS\| GREATER_THAN\| LESS_THAN_OR_EQ\| LESS_THAN\| GREATER_THAN_OR_EQ\| CONTAINS }" | 02="{EXPR}" | LO="{ > AND\|OR}" |
| | <CONDITION> . . . | | | | |
| </ROOT> | | | | | |

TABLE VII illustrates an exemplary XML format of the action data as stored in the database according to one preferred embodiment. In addition, the following is an example of a business logic action as may be stored in the database:

<ROOT>
  <ACTION MODULE="27" METHOD="2">
    <PARAM NAME="1002">C</PARAM>
    <PARAM TYPE="HTMLFORM" NAME="1003">23
    </PARAM>
    <PARAM TYPE="VALUE" NAME="1004">23</PARAM>
    <PARAM TYPE="VALUE" NAME="1005">{Tr.User} has closed help desk ticket {TR.Ticket #} at {Time}</PARAM>
    <PARAM TYPE="VALUE" NAME="1006">{Date} {Time}
    <PARAM>
  </ACTION>
</ROOT>

TABLE VII

| ROOT NODE | ACTION NODE | MODULE TO CALL | METHOD TO CALL | | |
|---|---|---|---|---|---|
| <ROOT> | | | | | |
| | <ACTION | MODULE="..." | METHOD="{Create\|Update\|Fetch\|Delete}" | | |
| | | PARAM NODE | NAME | VALUE | |
| | | <PARAM | NAME="..." | text value | </PARAM> |
| | | ... | | | |
| | </ACTION> | | | | |
| </ROOT> | | | | | |

As is evident, the business logic customization process 300 is a front-end process that provides easy to use user interfaces through which the administrator may non-programmatically, i.e., without directly writing computer software code within the business logic application, customize business logic. Such a customization process typically allows more flexibility and is more efficient in terms of both time and costs than, for example, a back-end customization process that requires programming or hard-coding computer software code in order for customization.

Furthermore, the business logic customization process 300 is ideally a dynamic process in which once a given customized business logic rule is committed to the business logic application, the customized business logic rule is ready for execution. In one embodiment, when a newly created or a modified business rule is committed to the database, a row of XML is added or modified within the database by the customizable business logic application.

The business logic customization process is generally also reusable within different areas of the business logic application. For example, the business logic customization process may be utilized to facilitate migration from a legacy business logic application to the customizable business logic application.

Business Rule Execution Process

Figure 10:
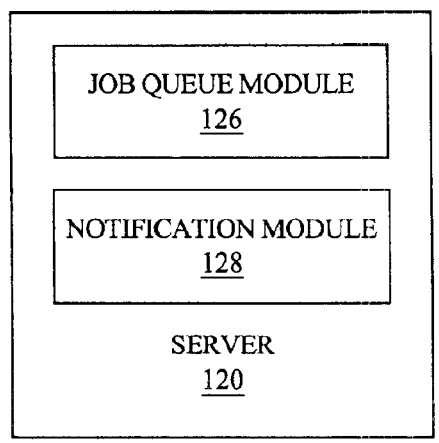
FIG. 10 is a block diagram illustrating some components of the application/web server for processing and executing certain processes of the customizable business logic application.

After a business rule is committed to the database, it is ready to be executed within the customizable business logic process. FIG. 10 is a block diagram illustrating some components of the application/web server 120 for processing and executing processes of the customizable business logic application.

As shown, the application/web server 120 generally includes a job queue module 126 and a notification module 128. Each of the job queue module 126 and the notification module 128 may be implemented within the server 120 as filters that run on the application/web server 120 until they are shut down.

Job Queue Module 126

The job module 126 process jobs in the job queue. The job queue is a service or processing mechanism that runs on the application/web server and continues running until, for example, IIS (Internet Information Server) and MTS (Microsoft Transaction Server) are shut down. The job queue is responsible for processing event jobs created or reported by the business logic application and for processing business rule instances created from event jobs. In other words, the job queue actually executes the business rule instances.

In addition, the job queue mechanism is preferably responsible for implementing the timing of business rule execution. In particular, the job queue performs business rule scheduling tasks such as delay or reschedule job execution, e.g., with respect to a time zone and/or a work schedule specified for the particular business rule, and/or recalculate repeat times for instances of business rules in a queue. The job queue also suspends business rule instances that fail in unexpected or expected conditions. Preferably, the job queue provides methods for easy manipulation of the jobs via user interface.

Notification Module 128

A notification process is a service that, similar to the job queue, is called once and remains active until it is shut down. The notification process may handle incoming and outgoing notification tasks and report events to the business logic system. For example, the notification module 128 may monitor incoming e-mail help desk requests for a specified MAPI profile using CDO (Collaboration Data Objects). When a matching incoming e-mail message arrives, the notification process reports the events to the business logic system.

For outgoing notification tasks, the notification module 128 may also handle outgoing notification events such as sending out mail, pager, telalert and/or netsend notifications. Preferably, the notification process supports multiple messaging platforms such as MS Exchange, Lotus Notes, and Novell GroupWise, MAPI as well␣as SMTP e-mail.

The notification module 128 may include or, alternatively, may communicate with a mail queue for notification-related tasks. The mail queue is a processing mechanism that facilitates the listening of incoming e-mail and the delivery of outbound e-mail.

As is evident, any number of business logic rules may be based around a given event reported to the business logic system by the notification module 128. Thus, any number of business rule instances may be created as a result and any number of actions may be taken as a result of the one event reported by the notification module 128.

Figure 11A:
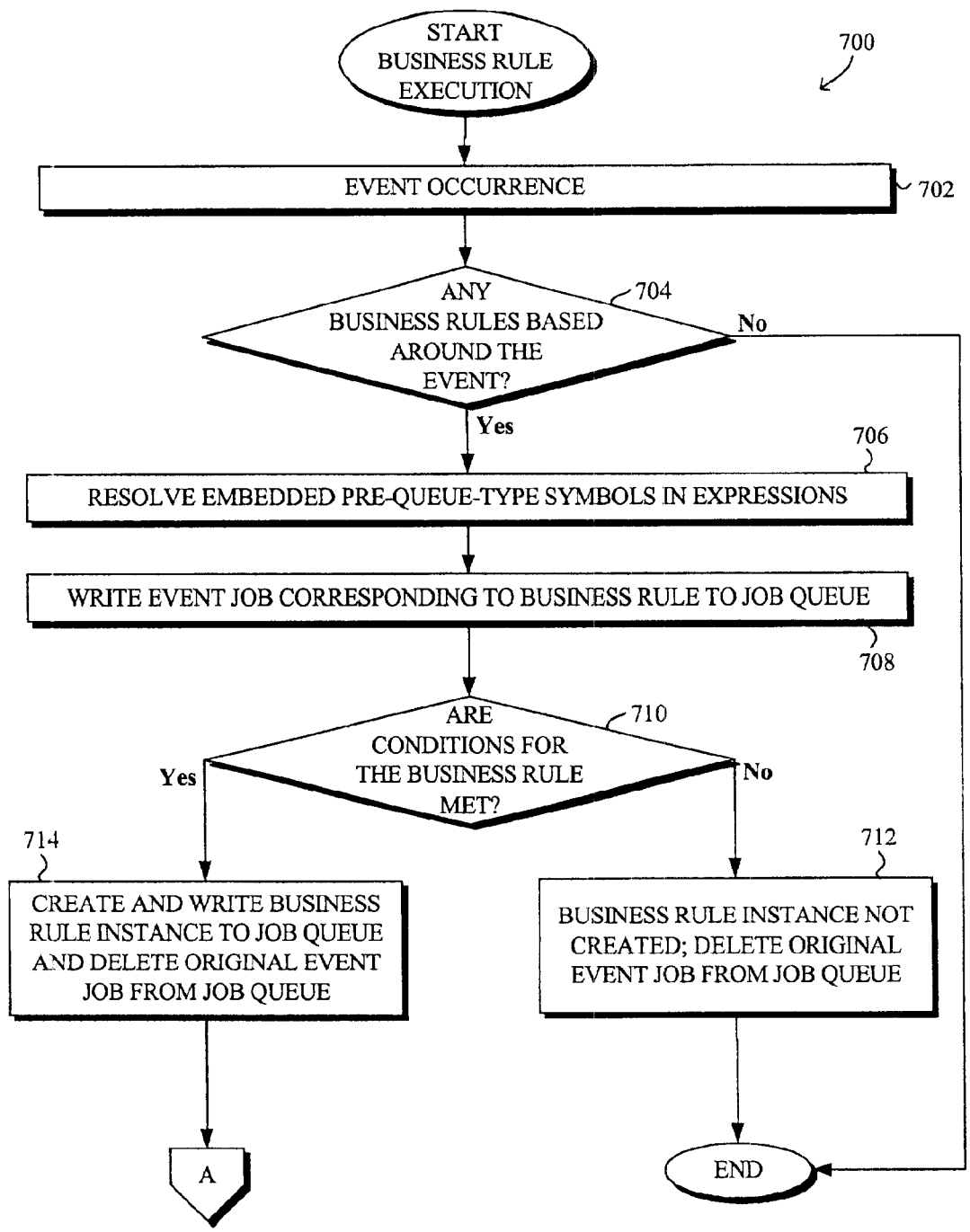
FIGS. 11A and 11B are flowcharts illustrating a process for business rule execution.
Figure 11B:
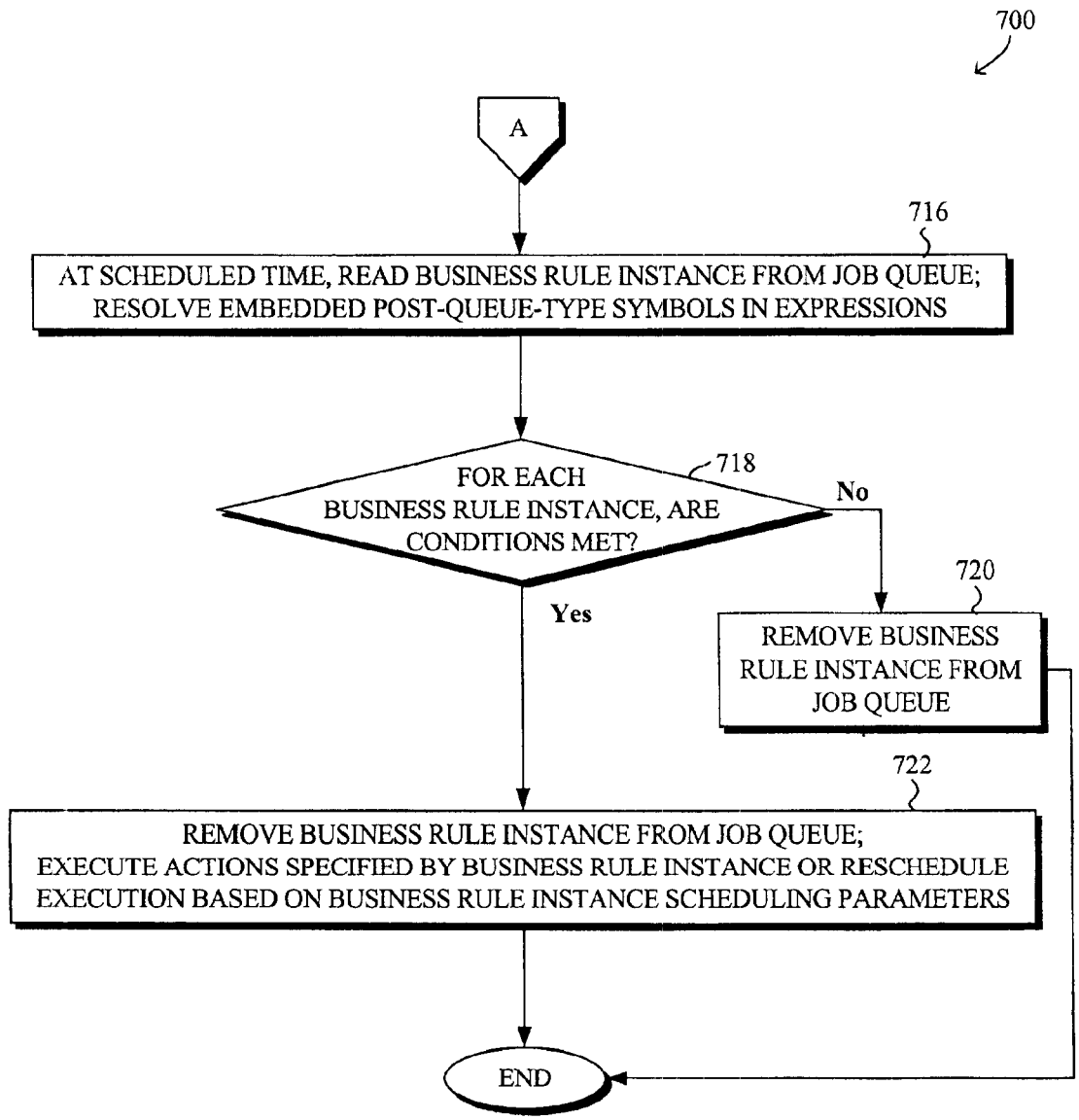

FIGS. 11A and 11B are flowcharts illustrating a process 700 for business rule execution upon each event occurrence. At step 702, an event occurs. At step 704, the business logic system determines if there are any business rules based around the event that occurred. If there are no business rules based around the event occurrence, then process 700 ends. Alternatively, if there is at least one business rule based around the event occurrence, then at step 706, any embedded pre-queue-type symbols in expressions of the business rule based around the event occurrence are resolved.

At step 708, an event job corresponding to the business rule is written to the job queue. An event job is a job that is created in the job queue when an event occurs in the business logic application system. Each event job may contain information about the event module and method, the transaction data, and the current record data.

It is noted that any number of business rules may be based around a given event occurrence. However, for purposes of clarity only, the business rule execution process 700 is described with reference to one business rule being based around the event occurrence.

Next, a conditions pre-evaluation is performed at step 710 in which the business logic system determines if all the conditions for an instance of the business rule are met prior to writing the business rule instance into the job queue. If the conditions are false, i.e., not met, a business rule instance is not created and the original event job is deleted from the job queue at step 712 and the business rule execution process is complete. Alternatively, if the conditions are true, i.e., met, a business rule instance is created and written to the job queue and the original event job is deleted from the job queue at step 714. One advantage of the conditions pre-evaluation step is that it facilitates in decreasing unnecessary build-up of business rule instances in the job queue that would eventually evaluate to false.

A business rule instance is a copy of a business rule that is supplemented by information about the event and additional scheduling calculations. When a given event occurs multiple times, many instances of the business rule are created in the job queue.

Referring now to FIG. 1B, at step 716, at a scheduled time for execution, the business rule instance is read from the job queue and any embedded post-queue-type symbols in expressions of the business rule instance are resolved. At step 718, the business logic system determines if all the conditions for the business rule instance are met. If not, then the business rule instance is removed from the job queue at step 720 and the business rule execution process is complete. Alternatively, if the conditions for the business rule instance are met, then at step 722, one or more actions specified by the business rule are executed and/or rescheduled based on business rule instance scheduling parameters and the business rule instance is removed from the job queue.

Runtime Verification Process

Although not expressly shown, the business rule process 700 also includes a runtime verification process. In particular, the runtime verification process checks that correct data types are being compared and assigned and checks for errors in conversion of data types, handling module and module parameter related errors, and elements of expressions that may not be available in various situations. Runtime errors that occur may be reported through, for example, a system message monitor. The runtime verification process, in addition to the design time verification process, minimizes problems resulting from malformed or invalid business logic statements. The runtime verification process is preferably run during step 706 (pre-queue resolution), 710 (condition evaluation), 716 (post-queue resolution), and 722 (actions execution).

Resolution of Pre- and Post-Queue Symbols in Expressions

Figure 12:
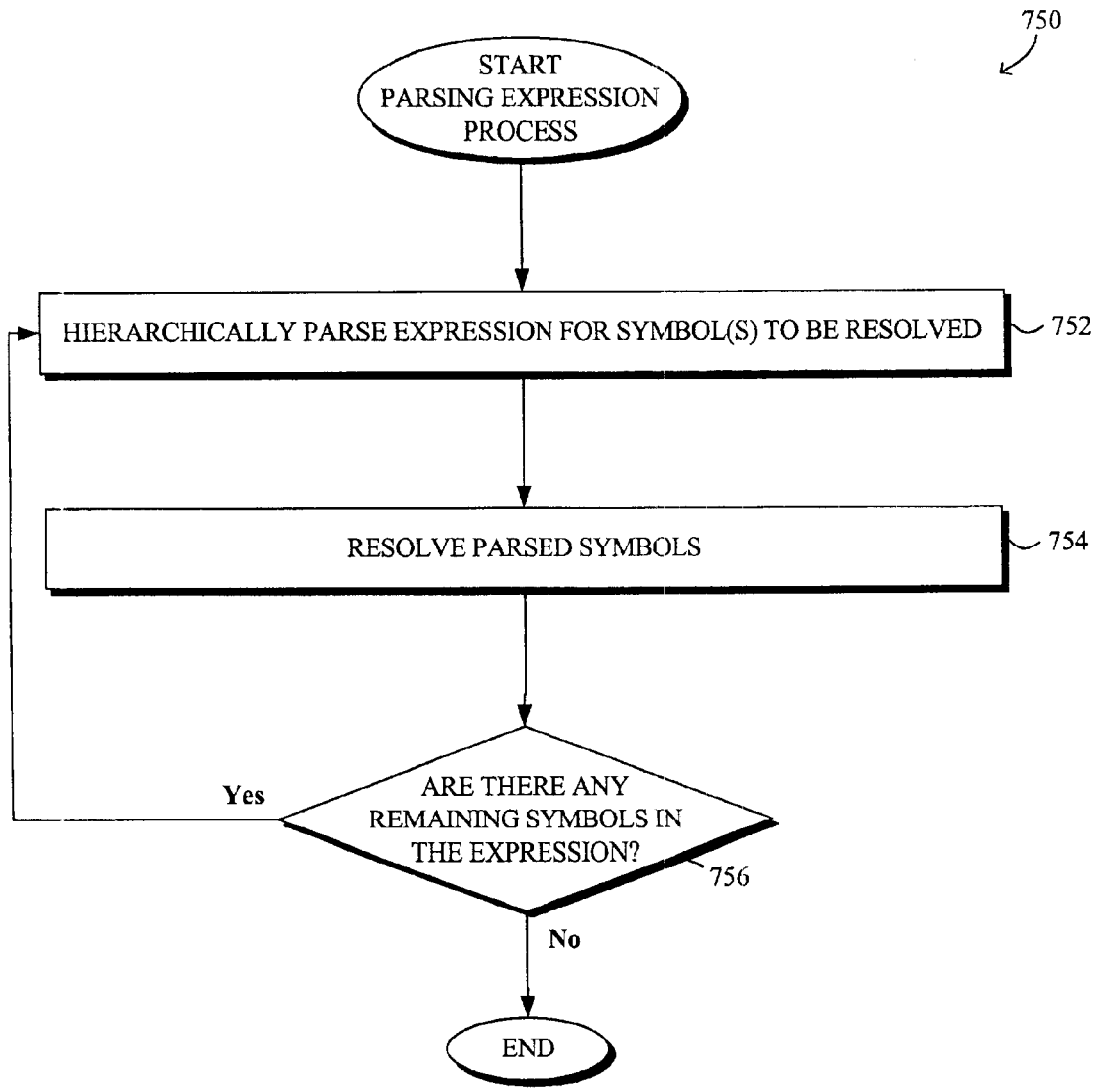
FIG. 12 is a flowchart illustrating a process for parsing expressions within a business rule for execution.

FIG. 12 is a flowchart illustrating a symbol resolution process 750. In particular, the symbol resolution process 750 is a phase of business rule execution that searches an expression for business logic symbols and replaces each symbol with the resulting value of that symbol. Depending upon the symbol, the symbol can be resolved when the business rule instance is created, i.e., pre-queue, or when the business rule instance is executed, i.e., post-queue. Pre-queue symbol resolution is a phase of business rule execution that resolves all symbols in an expression that are to be resolved when the business rule instance is created in the job queue. Analogously, post-queue symbol resolution is a phase of business rule execution that resolves symbols in an expression that are to be resolved when the business rule instance is executed from the job queue.

The symbol resolution process 750 preferably resolves symbols in an expression by hierarchically parsing and employing a recursive algorithm. In particular, the recursive process builds an XML tree in memory that allows for efficient management of the symbols and text in an expression. The symbols preferably support embedding such that the hierarchical parsing of this information is made easier via XML. XML also allows automatic validation of this data and XSLT (Extensible Stylesheet Language Transformations) is preferably used to instantaneously extract the data once the XML tree is built in memory.

In particular, at step 752, an expression is parsed for the hierarchically highest symbol(s). At step 754, the resulting symbols from step 752 are resolved. For example, with symbols are embedded within other symbols, inner-most symbols are resolved first while the outer-most symbols are resolved last. At step 756, it is determined if there are any symbols remaining to be resolved. If so, then the process 750 returns to step 752 to parse the expression for the next symbol(s) to be resolved. Alternatively, if all the symbols have been resolved in the expression, then the symbol resolution process 750 is complete.

General Purpose Computer System for Use By The Business Logic Application

Figure 13:
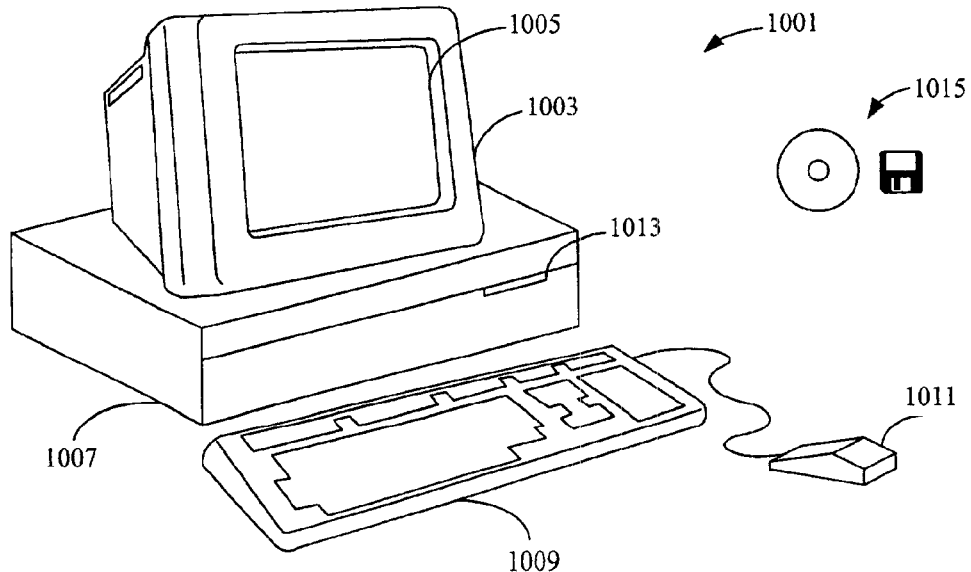
FIG. 13 illustrates an example of a computer system that can be utilized with the various embodiments of method and processing described herein.
Figure 14:
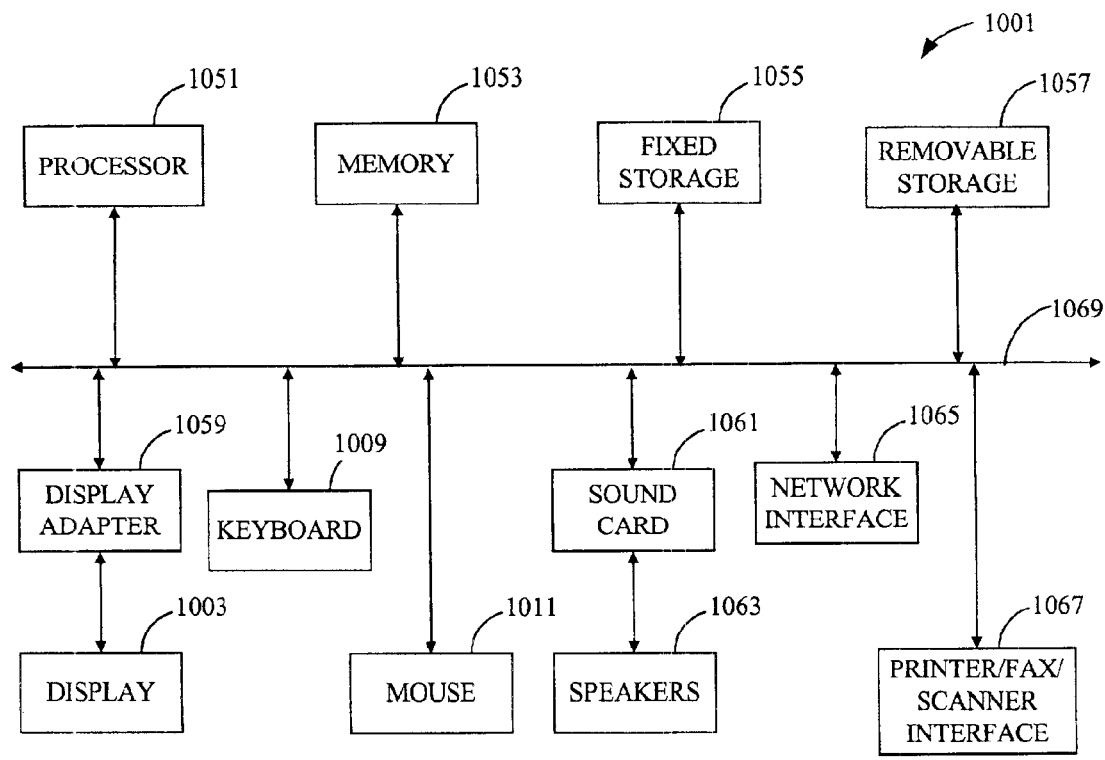
FIG. 14 illustrates a system block diagram of the computer system of FIG. 13.

FIGS. 13 and 14 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a bard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape;

optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

The computer system 1000 may be illustrative of the computer system of any or all of the computation nodes represented by the client, the server, and/or the database, for example, of a computing system in which the customizable business logic application system and method may be implemented.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A system for changing business processes of a business application, comprising:

means for serving a content page to a client browser of a client by a server, the content page allowing for entering and modifying of data relating to a business rule;

means for generating data by the server according to a predefined format from information received via the content page; and means for automatically committing the generated data in the predefined format into a database, the database storing data including data relating to business rules for implementing business rules entries in the database, the generated data being committed into a corresponding entry in the database;

wherein upon said committing, the committed database business rule entry is ready for execution by the business application;

wherein the entering of data includes selectively enabling, conditioning, calibrating, and disabling the business rule via the content page provided by the server.

2. The system for changing business processes of a business application of claim 1, wherein data for each business rule includes general information data, condition data, action data, and schedule data.

3. The system for changing business processes of a business application of claim 1, further comprising means for, prior to said committing, automatically verifying the entry corresponding to the business rule in the predefined format using DTDs (Document Type Definitions).

4. The system for changing business processes of a business application of claim 1, wherein said committing the entered data according to the predefined format includes committing the entered data according to a predefined XML format.

5. The system for changing business processes of a business application of claim 4, further comprising means for prior to said committing, automatically verifying the entry corresponding to the business rule in the predefined XML format using DTDs (Document Type Definitions).

6. The system for changing business processes of a business application of claim 1, wherein said serving the content page to the client browser includes serving an expression builder content page for entering and modifying of the data relating to the business rule expressed as an expression having symbols to be resolved when an instance of the business rule is one of created and executed by the business application.

7. The system for changing business processes of business application of claim 6, wherein data for each business rule includes schedule data, the schedule data selectively includes schedule expressed as an expression via the expression builder content page.

8. The system for changing business processes of a business application of claim 6, wherein data for each business rule includes action data, the action data selectively includes action data expressed as an expression via the expression builder content page.

9. The system for changing business processes of a business application of claim 6, wherein data for each business rule includes condition data, the condition data selectively includes a condition expressed as an expression via the expression builder content page.

10. The system for changing business processes of a business application of claim 1, wherein said serving the content page to the client browser includes serving a business rules management content page for displaying business rules stored as entries in the database and for allowing one of selecting to create a new business rule and selecting to modify an existing business rule.

11. A computer program product for changing business processes of a business application, comprising:
computer code that serves a content page to a client browser of a client, the content page allowing for entering and modifying of data relating to a business rule;
computer code that generates data according to a predefined format from information received via the content page;
computer code that automatically commits the generated data in the predefined formal into a database that stores data including data relating to business rules for implementing business rules as entries in the database, the computer code commits the generated data into a corresponding entry in the database such that the committed database business rule entry is ready for execution by the business application; and
a computer readable medium that stores said computer codes;
wherein computer code that serves the content page also allows selectively enabling, conditioning, calibrating, and disabling the business rule via the content page.

12. The computer program product for changing business processes of a business application of claim 11, wherein data for each business rule includes general information data, condition data, action data, and schedule data.

13. The computer program product for changing business processes of a business application of claim 11, further comprising computer code that automatically verifies the entry corresponding to the business rule in the predefined format using DTDs (Document Type Definitions).

14. The computer program product for changing business processes of a business application of claim 11, wherein computer code that commits the entered data according to the predefined format includes computer code that commits the entered data according to a predefined XML format.

15. The computer program product for changing business processes of a business application of claim 14, further comprising computer code that automatically verifies the entry corresponding to the business rule in the predefined XML format using DTDs (Document Type Definitions).

16. The computer program product for changing business processes of a business application of claim 11, wherein the computer code that serves the content page includes computer code that serves an expression builder content page for entering and modifying of the data relating to the business rule expressed as an expression having symbols to be resolved when an instance of the business rule is one of created and executed by the business application.

17. The computer program product for changing business processes of a business application of claim 16, wherein data for each business rule includes schedule data, the schedule data selectively includes schedule expressed as an expression via the expression builder content page.

18. The computer program product for changing business processes of business application of claim 16, wherein data for each business rule includes action data, the action data selectively includes action data expressed as an expression via the expression builder content page.

19. The computer program product for changing business processes of a business application of claim 16, wherein data for each business rule includes condition data, the condition data selectively includes a condition expressed as an expression via the expression builder content page.

20. The computer program product for changing business processes of a business application of claim 11, wherein the computer code that serves the content page to the client browser includes computer code that serves a business rules management content page for displaying business rules stored as entries in the database and for allowing one of selecting to create a new business rule and selecting to modify an existing business rule.

21. A business application system adapted for changing business processes associated with a business application, comprising:
a client having a client browser;
a database for storing, data including data relating to business rules for implementing business rules as entries in the database; and
a server having a web server adapted to serve at least one content page to the client browser for entering and modifying of the data of a business rule corresponding to an entry in the database,
wherein said server is adapted to automatically commit an entry corresponding to the business rule into the database according to a predefined format after modifications via the content page at said client browser and wherein the committed database business rule entry is ready for execution upon commitment by said server;
wherein each business rule can be selectively enabled, conditioned, calibrated, and disabled via the content page provided by the server at the client browser.

22. The business application system of claim 21, wherein data for each business rule includes general information data, condition data, action data, and schedule data.

23. The business application system of claim 21, wherein said server is adapted to verify the entry corresponding to the business rule in the predefined format using DTDs (Document Type Definitions).

24. The business application system of claim 21, wherein the predefined format for committing the entry corresponding to the business rule into the database is a predefined XML format.

25. The business application system of claim 24, wherein said server is adapted to verify the entry corresponding to the business rule in the predefined XML format using DTDs (Document Type Definitions).

26. The business application system of claim 21, wherein said server is further adapted to serve an expression builder content page to the client browser for entering and modifying of the data of the business rule expressed as an expression having symbols to he resolved when an instance of the business rule is one of created and executed.

27. The business application system of claim 26, wherein data for each business rule includes schedule data, the schedule data selectively includes a schedule expressed as an expression via the expression builder content page.

28. The business application system of claim 26, wherein data for each business rule includes action data, the action data selectively includes action data expressed as an expression via the expression builder content page.

29. The business application system of claim 26, wherein data for each business rule includes condition data, the condition data selectively includes a condition expressed as an expression via the expression builder content page.

30. The business application system of claim 21, wherein said server is further adapted to serve a business rules management content page to the client browser for displaying business rules stored as entries in the database and for allowing one of selecting to create a new business rule and selecting to modify an existing business rule.

31. An application/web server for implementing a business application system adapted for changing business processes associated with a business application, comprising:

a web server in communication with a client browser of a client and adapted to serve at least one non-programmatic interactive user page to the client browser for obtaining data for a customized business rule; and an application server in communication with a database containing data relating to business rules for implementing business rules as entries in the database, wherein the data obtained for the customized business rule corresponds to an entry in the database, wherein the application server is adapted to dynamically and automatically commit the data as an entry corresponding to the customized business rule into the database in a predefined format after obtaining the data via the user page at said client browser and wherein the committed database business rule entry is ready for execution upon commitment by said application server;

wherein each business rule in the database can be selectively enabled, conditioned, calibrated, and disabled via the at least one non-programmatic interactive user page.

32. The application/web server for implementing a business application system of claim 31, wherein said application server is adapted to verify the entry corresponding to the customized business rule in the predefined format using DTDs (Document Type Definitions).

33. The application/web server for implementing a business application system of claim 31, wherein the predefined format for committing the entry corresponding to the business rule into the database is a predefined XML format.

34. The application/web server for implementing a business application system of claim 33, wherein said application server is adapted to verify the entry corresponding to the business rule in the predefined XML format using DTDs (Document Type Definitions).

35. The application/web server for implementing a business application system of claim 31, wherein data for each business rule includes general information data, condition data, action data, and schedule data.

36. The application/web server for implementing a business application system of claim 31, wherein the at least one non-programmatic interactive user page includes a business rules management page for displaying business rules stored as entries in the database and for allowing one of selecting to create a new business rule and selecting to modify an existing business rule.

37. The application/web server for implementing a business application system of claim 31, wherein the at least one non-programmatic interactive user page includes an expression builder page expressing data of the business rule as an expression having at least one symbol that is to be resolved when an instance of the business rule is one of created and executed.

38. The application/web server for implementing a business application system of claim 37, wherein data for each business rule includes schedule data, the schedule data selectively includes a schedule expressed as an expression via the expression builder page.

39. The application/web server for implementing a business application system of claim 37, wherein data for each business rule includes action data, the action data selectively includes action data expressed as an expression via the expression builder page.

40. The application/web server for implementing a business application system of claim 37, wherein data for each business rule includes condition data, the condition data selectively includes a condition expressed as an expression via the expression builder page.

41. A system for processing business rules and changing business processes associated with a business application, comprising:

means for writing an event job into a job queue for each occurrence of an event having at least one business rule based on occurrence thereof;

means for creating a business rule instance for each business rule corresponding to the event job;

means for testing conditions of each business instance;

means for writing the business rule instance into the job queue corresponding to each business instance for which the conditions testing succeeds;

means for deleting the event job from the job queue;

means for executing the business rule instance; and means for deleting the business rule instance from the job queue;

wherein the business rules can be selectively enabled, conditioned, calibrated, and disabled via a content page provided by a server at a client browser.

42. The system for processing business rules of claim 41, further comprising means for scheduling the business rule instance, wherein said executing the business rule instance is according to said scheduling.

43. The system for processing business rules of claim 42, wherein said scheduling the business rule instance is selected from the group consisting of delaying job execution, rescheduling job execution, scheduling repeat executions, and suspending execution.

44. The system for processing business rules of claim 41, wherein said executing the business rule instance comprises:

testing conditions of the business rule instance;

if the instance conditions testing fails, deleting the business rule instance from the job queue; and if the instance conditions testing succeeds:

executing actions specified by the business rule instance, and deleting the business rule instance from the job queue.

45. The system for processing business rules of claim 44, wherein said executing actions specified by the business rule instance comprises:

scheduling execution using an execution schedule as determined according to scheduling data of the business rule instance; and executing actions specified by the business rule instance according to the execution schedule.

46. The system for processing business rules of claim 41, further comprising means for resolving embedded pre-queue symbols in expressions of the event job corresponding to the business rule.

47. The system for processing business rules of claim 46, wherein said resolving embedded pre-queue symbols in expressions of the event job comprises:

parsing the expression hierarchically; and resolving the symbols in a recursive manner.

48. The system for processing business rules of claim 41, further comprising means for resolving embedded post-queue symbols in expressions of the business rule instance.

49. The system for processing business rules of claim 48, wherein said resolving embedded post-queue symbols in expressions of the business rule instance comprises:
parsing the expression hierarchically; and
resolving the symbols in a recursive manner.

50. The system for processing business rules of claim 41, further comprising:
means for monitoring for incoming notification events; and
means for reporting the incoming notification events.

51. The system for processing business rules of claim 41, wherein said executing the business rule instance includes selectively transmitting an outgoing notification.

52. The system for processing business rules of claim 51, wherein the outgoing notification is selected from the group consisting of mail, pager notification, Telalert, and NT network message notifications.

53. A business application system for implementing business rules and changing business processes associated with a business application, comprising:
a job queue module for maintaining a job queue and processing jobs in the job queue; and
a notification module in communication with said job queue module for monitoring for incoming notification events and reporting the incoming notification events to the job queue module,
wherein said job queue module writes an event job corresponding to a business rule to the job queue upon receiving an incoming notification event that matches a triggering event of the business rule,
said job queue module tests conditions of the business rule corresponding to the event job, deletes the event job from the job queue, and, if conditions of the business rule are met, writes a business rule instance to the job queue, and
said job queue module processes the business rule instance and deletes the business rule instance from the job queue;
wherein the business rules can be selectively enabled, conditioned, calibrated, and disabled via a content page provided by a server at a client browser.

54. The business application system of claim 53, wherein the job queue module processes the business rule instance by scheduling the business rule instance and executing the business rule instance is according to the scheduling.

55. The business application system of claim 54, wherein the scheduling by the job queue module is selected from the group consisting of delaying job execution, rescheduling job execution, scheduling repeat executions, and suspending execution.

56. The business application system of claim 53, wherein the job queue module processes the business rule instance includes testing conditions of the business rule instance, executing actions specified by the business rule instance if the conditions testing succeeds, and deleting the business rule instance form the job queue.

57. The business application system of claim 56, wherein the job queue module executes actions specified by the business rule instance includes scheduling execution according to scheduling data of the business rule instance and executing actions specified by the business rule instance according to the execution scheduling.

58. The business application system of claim 53, wherein the job queue module resolves any embedded pre-queue symbols in expressions of the event job corresponding to the business rule.

59. The business application system of claim 58, wherein the job queue module resolves embedded pre-queue symbols by parsing the expression hierarchically and resolving the symbols in a recursive manner.

60. The business application system of claim 53, wherein the job queue resolves any embedded post-queue symbols in expressions of the business rule instance.

61. The business application system of claim 60, wherein the job queue module resolves embedded post-queue symbols by parsing the expression hierarchically and resolving the symbols in a recursive manner.

62. The business application system of claim 53, wherein the notification module monitors for incoming notification events and reports the incoming notification events to the job queue module.

63. The business application system of claim 53, wherein the job queue module processes the business rule instance by selectively transmitting an outgoing notification to the notification module.

64. The business application system of claim 63, wherein the notification module processes an outgoing notification task received from the job queue module by sending out a notification selected from the group consisting of mail, pager notification, Telalert and NT network message notifications.

* * * * *

UNITED STATES PATENT AND TRADEMARK OFFICE
CERTIFICATE OF CORRECTION

PATENT NO. : 6,868,413 B1  Page 1 of 1
APPLICATION NO. : 09/853360
DATED : March 15, 2005
INVENTOR(S) : Grindrod et al.

It is certified that error appears in the above-identified patent and that said Letters Patent is hereby corrected as shown below:

In the claims:
col. 22, line 16 insert --as-- before "entries" and after "rules";
col. 22, line 41 replace "for" with --for,--;
col. 22, line 52 insert --a-- before "business" and after "of";
col. 23, line 18 replace "formal" with --format--;
col. 23, line 63 insert --a-- before "business" and after "of";
col. 24, line 18 replace "storing," with --storing--;
col. 28, line 27 replace "resolves" with --resolves,--.

Signed and Sealed this

Sixteenth Day of February, 2010

David J. Kappos
*Director of the United States Patent and Trademark Office*